INVENTOR.
PHILIP BARONE
BY William N. Antonis
ATTORNEY

2 Claims

ABSTRACT OF THE DISCLOSURE

The following relates to an automatic brake adjuster mechanism for use with an aircraft disc brake wherein a frictional clamping mechanism is utilized to determine the released position of the pressure plate. The clamping mechanism is located within the spring follower and is adjustable so that the frictional clamping force can be varied to suit any size or type brake with which it is utilized.

Background of the invention

In the construction of the typical disc-type brake, there is provided a number of interleaved rotor and stator members, some of which are lined with suitable friction material. At one side of the "stack" of rotors and stators is a fixed backing plate against which the stack of rotors and stators is thrust, and at the opposite side of the stack is a pressure plate which bears against the stack of rotors and stators and presses them together and against the backing plate. The rotors, stators, and pressure plate are all axially movable to permit their inter-engagement. Since the pressure plate has a maximum axial movement, adjustment of the release position of this plate is, in effect, an adjustment of the brake as a whole.

Summary of the invention

Accordingly, it is an object of this invention to provide a brake adjuster mechanism which will automatically adjust the position of the pressure plate for the next brake application.

Another object of this invention is to provide an automatic brake adjuster mechanism which will be more efficient and reliable in operation and more simple in construction than comparable type mechanisms.

A further object of the present invention is to control the automatic brake adjustment by means of a simple frictional clamping device which determines the released position of the pressure plate. Such a frictional clamping device will provide a positive but not immovable connection between a retraction-limiting member secured to the pressure plate and a fixed part of the brake assembly.

A still further object of this invention is to provide an automatic brake adjuster mechanism having a return spring therein which will retain the length and force of the return spring substantially constant regardless of the extent of adjustment. In other words, the length of the return spring in the released or retracted position and therefore, the force required to compress the spring will remain substantially the same regardless of the released position of the pressure plate.

More specifically, it is an object of this invention to provide an automatic brake adjuster mechanism which utilizes a split collet, located within a return spring follower for frictionally engaging the pressure plate positioning member, and a torque member operatively connected to and located between the collet and follower for varying the frictional clamping force of the collet.

The above and other objects and features of the invention will become apparent from the following description of the mechanism taken in connection with the accompanying drawings.

Description of the preferred embodiments

Figure 1:
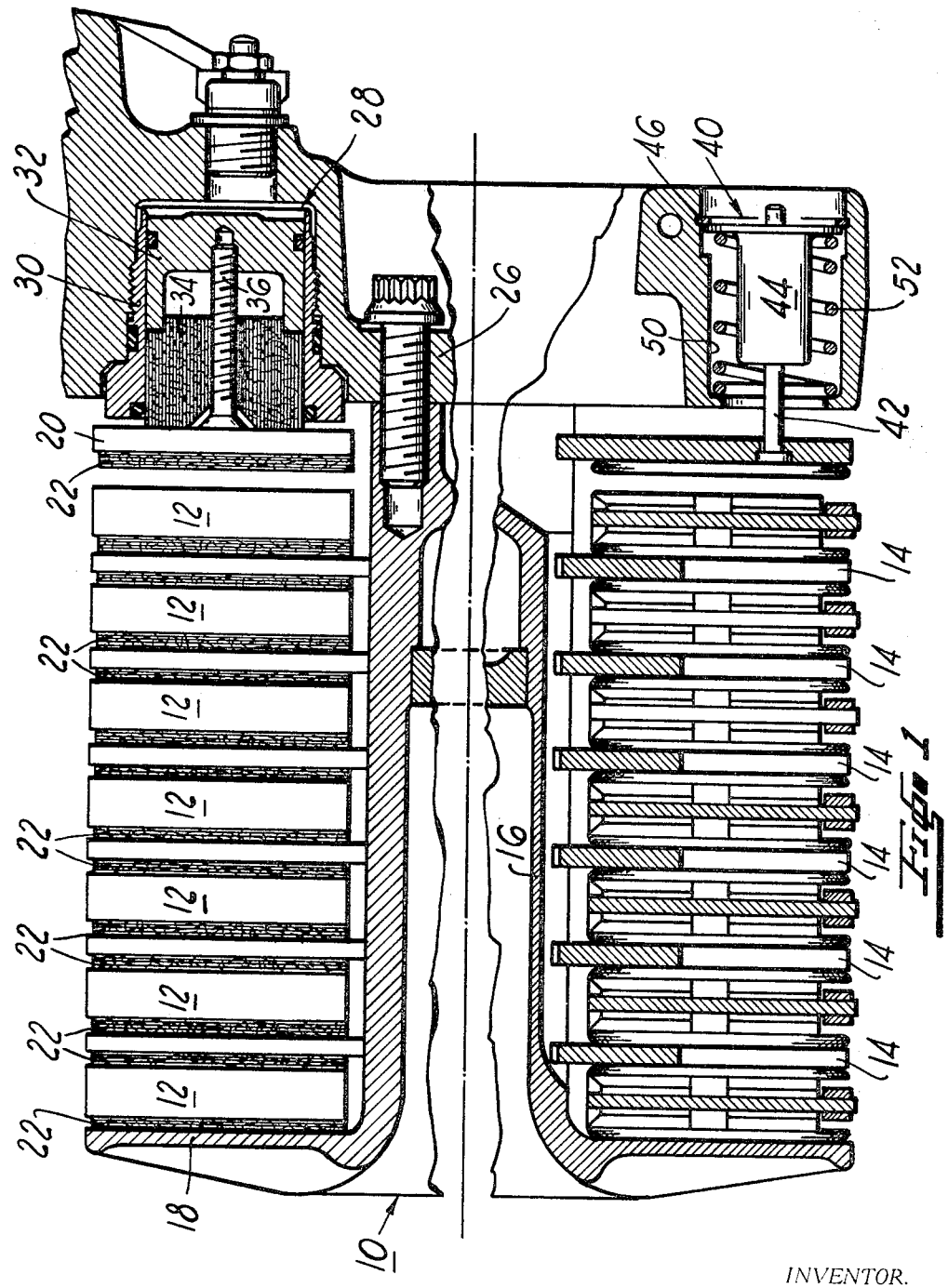
FIGURE 1 is a fragmentary axial sectional view taken through a disc brake incorporating the invention.

Referring to FIGURE 1, it will be seen that the numeral 10 designates, generally, an aircraft brake of the disc-type construction. The brake consists of a plurality of interleaved rotors 12, which are splined to and are rotated by the aircraft wheel (not shown), and stators 14, which are splined to a non-rotatable torque tube 16. Both the rotors and stators are movable axially and are sometimes referred to as a brake "stack." It is the frictional engagement of these relatively rotatable rotors and stators which produces the braking action on the aircraft wheel. At one side of the stack is an upturned flange 18 of the torque tube 16 which is hereinafter referred to as a backing plate. At the other side of the stack is a pressure plate 20, the purpose of which is to clamp the rotors 12 and stators 14 together by thrusting at one side of the stack and biasing the entire stack against the backing plate 18.

Pressure plate 20, each of the stators 14, and the backing plate 18, have friction material lining 22 provided thereon. The lining is often formed in segments and is individually attached by rivets, or the like, to its associated mounting structure. Neither the composition, arrangement, nor mounting of the friction segments forms an essential part of the present invention.

Adjacent the pressure plate 20 is a carrier plate 26 which is connected to the axle (not shown) through any suitable means. The carrier contains a plurality of fluid motors 28 (only one of which is shown), each of which includes a protective sleeve 30 threaded to the carrier, and a piston 32 located and slidable in the sleeve. A block of insulating material 34 is secured to the head end of the piston by a threaded pin 36 for protecting the hydraulic brake fluid from the heat generated during braking.

Also mounted on the carrier plate 26 are a plurality of automatic brake adjuster mechanisms designated generally by the reference numeral 40. Each adjuster mechanism includes an axially extending pin-type positioning member 42 which is suitably secured to the pressure plate 20. An axially movable sleeve-type spring follower 44 is movable between a first fixed stop means formed by a retaining ring 46 and a second stop formed by a shoulder 48 of bore 50. A return spring 52 is located in bore 50 and is compressed between an outwardly extending flange 54 formed at one end of the spring follower 44 and a second shoulder 56 formed in the bore 50. The spring follower, also, is formed with an inwardly extending flange 58 for a purpose to be hereinafter described. Located within the sleeve-type spring follower is a split-type collet 60 which is concentric with the pin-type positioning member 42 and frictionally engages same. A torque member 62, which is externally threaded and engages internal threads formed on the spring follower at 64, is concentrically located between the collet and the follower. It will be seen from FIGURES 2 and 3 that the collet is formed with an outer frusto conical surface 66 which abuts the inwardly extending flange 58 at the base thereof. The torque member is formed with a mating inner surface 68 which engages the frustoconical surface of the collet. Thus, it will be apparent that rotation of the torque member will cause the torque member to move towards the frustoconical surface of the collet and increase the frictional clamping force of the collet against the positioning member 42.

Figure 2:
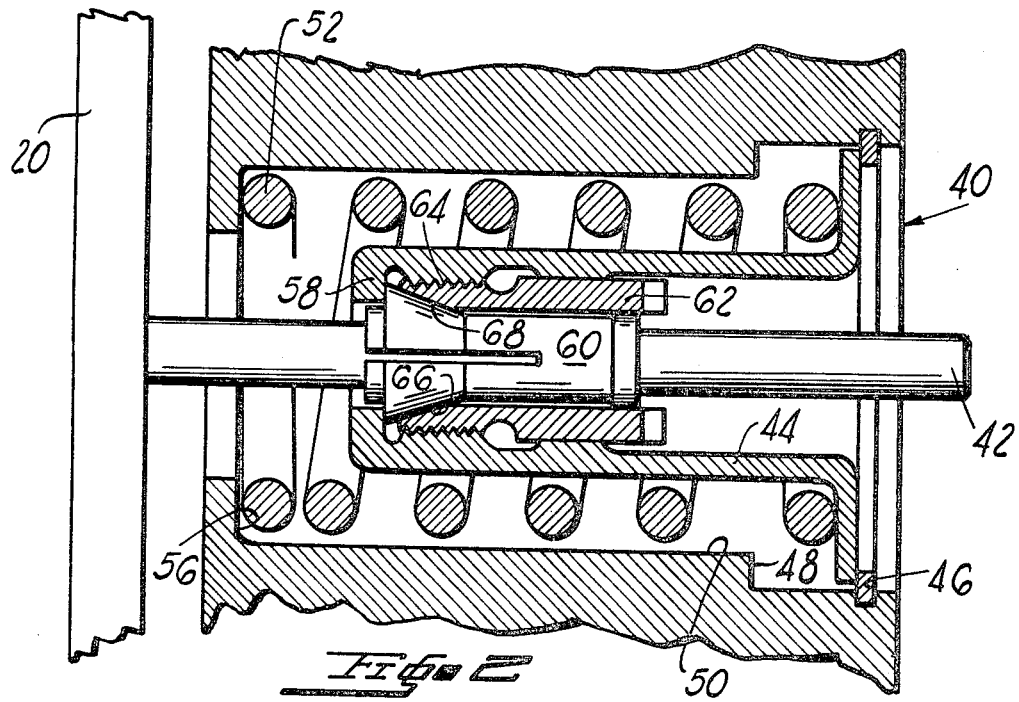
FIGURE 2 is an enlarged sectional view of the automatic brake adjuster mechanism shown in FIGURE 1 with the pressure plate shown in its original position.
Figure 3:
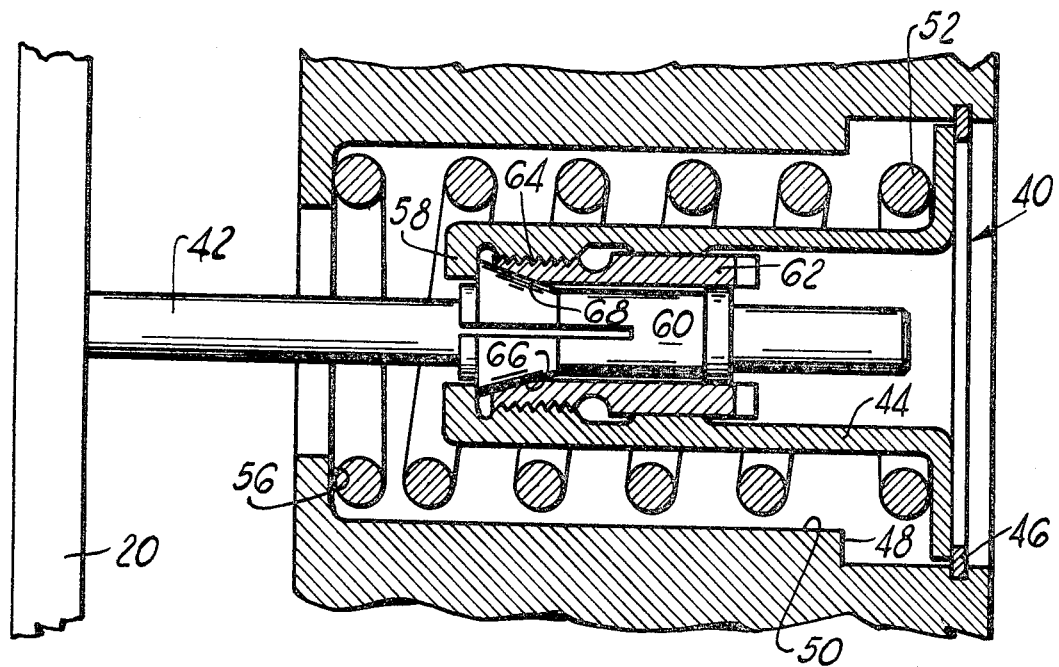
FIGURE 3 is a sectional view, similar to that of FIGURE 2, with the pressure plate shown in an adjusted position after the brake has been in use for an extended period.

Referring to FIGURES 2 and 3, wherein the adjuster mechanism of FIGURE 1 is more clearly illustrated, it will be seen that upon movement of the pressure plate 20, through actuation of the fluid motors 28, the split collet member, which frictionally engages the pin 42, will permit concomitant and equal axial movement of the pin 42 and the spring follower member 44 during the brake application until the follower member has moved from the first stop 46 to the second stop 48, at which time continued independent axial movement of the pressure plate and pin 42 will cause the pin 42 to slide with respect to the collet which abuts the inwardly extending flange 58 of the spring follower, so that the axial relationship between the pressure plate 20 and the follower 44 will be properly adjusted for the next brake application.

Thus, the running clearance, that is, the amount of the return travel of the pressure plate 20 after release of the braking force, is determined by the available travel of the spring follower 44 between the first and second stops 46 and 48, respectively. Therefore, as the braking components wear, the pressure plate travel will exceed that which is available to the spring follower. This difference in travel is permitted by the relative movement between the collet and the pin 42 which it frictionally engages. The force necessary to cause the pin 42 to move relative to the collet 60 will, of course, be greater than that exerted by the return spring 52 by a suitable margin. Upon release of the braking pressure, the return spring will retract the pressure plate only the distance which the spring follower can move from the second stop 48 to the first stop 46. In this manner the mechanism automatically provides for a constant running clearance in the brake.

The several practical advantages which flow from the above-described simple, compact, unitary, adjustable mechanism are believed to be obvious and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of components without departing from the spirit of the invention. For example, although the invention is described in conjunction with a disc-type brake in which laterally movable relatively rotatable friction members are forcibly engaged during a brake application, it will be appreciated that the invention is also usable with other braking devices.

I claim:

1. In a brake having an axially fixed member and an axially movable member which moves a distance at least partially dependent upon the amount of brake wear, an automatic adjuster mechanism for automatically changing the released position of said axially movable member to maintain a substantially constant brake clearance comprising a sleeve-type spring follower axially movable between first and second fixed stop means located on said fixed member, an axially extending pin-type positioning member located within and extending through said spring follower, said positioning member being secured to said axially movable member, a return spring located without said spring follower, said spring being compressed between said follower and fixed abutment means carried by said fixed member, and adjustable means operatively connected to and located between said spring follower and said positioning member for frictionally engaging said positioning member at a first location so as to permit concomitant and equal axial movement of said positioning member and said follower during a brake application until said follower has moved from said first to said second stop means and continued independent axial movement of said positioning member thereafter, said continued independent axial movement of said positioning member after contact of said follower with said second stop means causing said adjustable means to frictionally engage said positioning member at a second location so that the axial relationship between said positioning member and said follower will be changed with the next brake application, said adjustable means including a clamping member for frictionally engaging said positioning member and a torque member operatively connected to said clamping member for varying the frictional clamping force of said clamping member against said positioning member, said clamping member being a split collet which is concentric with said positioning member and is formed with an outer frusto-conical surface which abuts an inwardly extending flange formed on said follower, said torque member being concentrically located between said collet and said follower and formed with a mating inner surface for engaging the frusto-conical surface of said collet, said torque member further being externally threaded for engaging internal threads formed on said follower so that rotation of said torque member will cause said torque member to move towards said frusto-conical surface of said collet and increase the frictional clamping force of said collet against said positioning member.

2. The structure, as defined in claim 1, wherein said follower is formed with an outwardly extending flange at the end opposite said inwardly extending flange, said outwardly extending flange being utilized as a retainer for said spring and a stop member for contact with said first and second fixed stop means located on said fixed member.

References Cited

UNITED STATES PATENTS 2,830,680  4/1958  Hawley.
2,900,052  8/1959  Frayer et al.

FOREIGN PATENTS 738,034  10/1955  Great Britain.

DUANE A. REGER, *Primary Examiner.*

U.S. Cl. X.R.

188—72